(12) United States Patent
Zimmerman (10) Patent No.: US 8,868,971 B2
(45) Date of Patent: Oct. 21, 2014

(54) WIRELESS DIAGNOSTIC SYSTEM

(75) Inventor: Dennis A. Zimmerman, Bridgewater, VA (US)

(73) Assignee: Comsonics, Inc., Harrisonburg, VA (US)

( * ) Notice: Subject to any disclaimer, the term of this patent is extended or adjusted under 35 U.S.C. 154(b) by 352 days.

(21) Appl. No.: 13/251,350

(22) Filed: Oct. 3, 2011

(65) Prior Publication Data

US 2012/0042213 A1 Feb. 16, 2012

Related U.S. Application Data

(63) Continuation of application No. 12/550,735, filed on Aug. 31, 2009, now Pat. No. 8,112,669.

(51) Int. Cl.
| | |
|---|---|
| *G06F 11/00* | (2006.01) |
| *H04L 12/26* | (2006.01) |
| *H04L 1/24* | (2006.01) |
| *G06F 11/22* | (2006.01) |

(52) U.S. Cl.
CPC ............... *H04L 1/244* (2013.01); *H04L 43/12* (2013.01); *H04L 43/50* (2013.01); *G06F 11/2294* (2013.01)
USPC .............. 714/25; 714/27; 714/31; 714/44

(58) Field of Classification Search
None
See application file for complete search history.

(56) References Cited

U.S. PATENT DOCUMENTS

| | | | |
|---|---|---|---|
| 6,953,150 B2 * | 10/2005 | Shepley et al. | 235/379 |
| 7,677,447 B2 * | 3/2010 | MacPhail et al. | 235/380 |
| 2008/0121692 A1 * | 5/2008 | MacPhail et al. | 235/379 |
| 2008/0219335 A1 | 9/2008 | Marr et al. | |
| 2010/0258621 A1 * | 10/2010 | Schlabach et al. | 235/379 |
| 2012/0160913 A1 * | 6/2012 | Shepley et al. | 235/379 |

* cited by examiner

*Primary Examiner* — Christopher McCarthy
(74) *Attorney, Agent, or Firm* — Whitham, Curtis, Christofferson & Cook, P.C.

(57) ABSTRACT

Results of field testing of portions of a distributed system such as a Broadband Communications System are communicated from a testing device to a device including a display which downloads test protocols to the testing device. The testing device can thereafter operate in a stand-alone manner and transfer the results of testing and analysis to a device including a display that may comprise virtually any wireless communication device by storing an application or information therein. The communication device can transfer captured test data and analysis to a central facility for storage, further analysis and/or management purposes.

16 Claims, 5 Drawing Sheets

WIRELESS DIAGNOSTIC SYSTEM

CROSS-REFERENCE TO RELATED APPLICATIONS

This application is a continuation-in-part of U.S. patent application Ser. No. 12/550,735, filed Aug. 31, 2009, now U.S. Pat. No. 8,112,669 the entirety of which is hereby fully incorporated by reference and benefit of priority under 35 U.S.C. §120 is hereby claimed as to all subject matter that is common to that application.

FIELD OF THE INVENTION

The present invention generally relates to test equipment interconnectivity for testing the operating condition of a geographically distributed system such as a Broadband Communications System and, more particularly, for providing transmitted results of testing to an operator of the test equipment as well as logging and/or analyzing test results at another portion of the system and/or independently of the system such as a central facility or a combination thereof.

BACKGROUND OF THE INVENTION

In recent years, many systems have been developed for various purposes, wherein the systems are distributed over a potentially large area. The distribution of portions of the systems thus requires that testing of the operational conditions of the system be performed locally to respective portions of the system and requires test equipment and trained operators thereof who are also trained to effect most, if not all, types of installation, repair or maintenance to perform testing at the respective portions of the system using portable equipment. So-called Broadband Communications Systems such as are currently used for distribution of entertainment programming, Internet access, telephone service and the like are exemplary of systems where testing must be performed at particular locations of portions of the system not only to assure adequate performance of the system but to prevent egress of broadband signals that may interfere with other communications transmissions. Further, signal quality and substantial freedom from signal ingress and egress is of paramount importance, particularly where additional services such as high-speed digital computer network connections and digital telephone connections (e.g. using voice over internet protocol) are provided over the Broadband Communications System infrastructure. Many testing devices for such systems have been developed and are known at the present time. However, some known test equipment that relies on detection of a carrier or other fixed frequency signal is being rendered obsolete by cable systems carrying only digital signals.

Such testing devices require that testing operations be controllable by the operator of the test equipment and the results of testing be communicated to the operator of the testing device so that any problems or out-of-tolerance conditions can be diagnosed, the cause(s) located and remedial action taken. Thus, a keyboard and display or other structures capable of such data entry and communication functions are generally provided as part of the test instrument. Such input and output devices often represent a significant fraction of the cost of the test instrument. Since tests to be performed are often numerous and complex, it is also generally desirable for testing protocols to be at least partially automated (e.g. to at least provide prompts to a user of a preferred sequence of tests of different parameters within an overall testing protocol and to automate various steps within each testing operation) so that a potentially complex test can be performed upon entry of a simple command by the user. Testing devices or instruments are also required to be sufficiently rugged to withstand field use which also contributes significantly to their cost while input and output arrangements are significant sources of potential damage that can possibly disable the test instrument and require expensive repairs.

It is also generally desirable and often required that the test results be documented. For example, during installation of service and/or new equipment for communication to (and/or from) a particular location, in excess of twenty separate tests may be performed at a number of different locations within a given installation to qualify the installation as being completely and correctly installed (including accommodation of the environment of the installation such as noise sources) and capable of providing high-speed data connections when the installation is completed. Documentation of the measured signal parameters can thus prove that the installation is capable of delivering merchantable service as well as providing a baseline against which a need for repairs or upgrades may be determined. However, manual recording and transcription (usually as a paper copy at the present time) of numerous parameter values is necessarily time-consuming and subject to errors; causing delays and providing no assurance that adequate quality of service is provided by the installation or that repairs are adequately effective before installation or maintenance personnel leave the work site. Additionally, there is no provision for work orders to be received and cleared in a timely fashion. As a result, scheduling of repairs and installation is complicated and inefficient while numbers of "call-backs" to improve or correct installations and repairs appears to be much larger than might otherwise be achieved.

As a partial solution to this latter problem, technical maintenance personnel sometimes carry laptop or notebook computers with wireless network communication capability and/or wireless communication devices (e.g. so-called palm-top devices or communication device similar to those used for object tracking in courier delivery systems and the like) into the field for problem diagnosis, to suggest particular test protocol sequences and in order to make more timely reports of work done. However, doing so is cumbersome and inconvenient and involves redundant input and output structures between the testing device and the communication device which are often of substantial weight and bulk as well as requiring plural devices to be carried into the field and manipulated at the work site. In such arrangements, manual transcription of measured data which may be stored in the testing instrument remains subject to error or the portable computer device must be programmed to perform downloads of stored data from the test instrument which must remain capable of autonomous operation under direct control of the operator. Additionally, it is known to provide peripheral equipment for personal computers to allow the personal computer in combination with the peripheral device to function as a test instrument. A spectrum analyzer head is an example of such a peripheral device. However, for making field measurements of performance of Broadband Communication Systems such arrangements are not practical since the amount of equipment that must be carried and moved between locations at an installation site is increased far beyond the functionality actually required for the measurements to be made.

SUMMARY OF THE INVENTION

It is therefore an object of the present invention to provide a test instrument system which is compact, light weight, rugged, convenient to use and of reduced cost due to elimination of redundant components while being capable of potentially simultaneous communications with an operator (e.g. through a companion PC, PDA or the like and concurrent documentation of test results in a manner which is virtually free from human error or possible falsification.

It is another object of the invention to provide a method of testing portions of a distributed system and wirelessly communicating results of such testing in substantially real-time.

It is a further object of the invention to provide a substantially real-time communication system which will support analysis for detecting trends, evaluating personnel performance and/or making management decisions including workforce management and scheduling with increased efficiency and workforce effectiveness; which additional analysis facility can be included in the overall system in accordance with the invention for end-to-end monitoring and management and efficiency improvement of a Broadband Communication System.

It is yet another object of the invention to provide a small, light-weight, rugged and fully automated stand-alone measurement instrument for making sequences of measurements appropriate to installation, maintenance and repair of Broadband Communication Systems which can store results of measurements for later transmission to any communication device for local display and/or communication to a central facility for archival storage, system administration and the like purposes.

It is another further object of the invention to provide a measurement system for facilitating installation, performance measurement, qualification documentation and/or system administrations that can include any wired or wireless communication device as an interface to a stand-alone, automated measurement device in order to leverage developments in capabilities of communication devices and thus provide improved convenience for installation and maintenance personnel while avoiding obsolescence of the stand-alone, automated measurement device.

In order to accomplish these and other objects of the invention, a test system for measuring operating parameters of a distributed system is provided comprising a testing device including a connector for connection to a test point, a memory for storing instructions for a plurality of test sequences, and a processor responsive to commands for executing the instructions to perform the test sequences and collecting data responsive to said test sequences, a controller physically separate from the testing device including a manual input arrangement, a display, and a processor responsive to the manual input arrangement for controlling storage and execution of the instructions for a plurality of test sequences in the testing device and receiving, storing and displaying data collected by said testing device, and a communication link between the testing device and the controller for communicating control signals and the instructions for a plurality of said test sequences from said controller to the testing device and communicating data collected by the testing device to the controller.

In accordance with another aspect of the invention, a method of testing portions of a distributed system is provided including establishing a communication link between a testing device and a controller physically separate from the testing device, storing instructions for a plurality of test sequences in the testing device under control of said controller, connecting the testing device to a test point of the distributed system, transmitting from the controller to the testing device a command to perform a test sequence, performing the test sequence and collecting test data at the testing device, transmitting the test data from the testing device to the controller; and displaying the test data at the controller.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
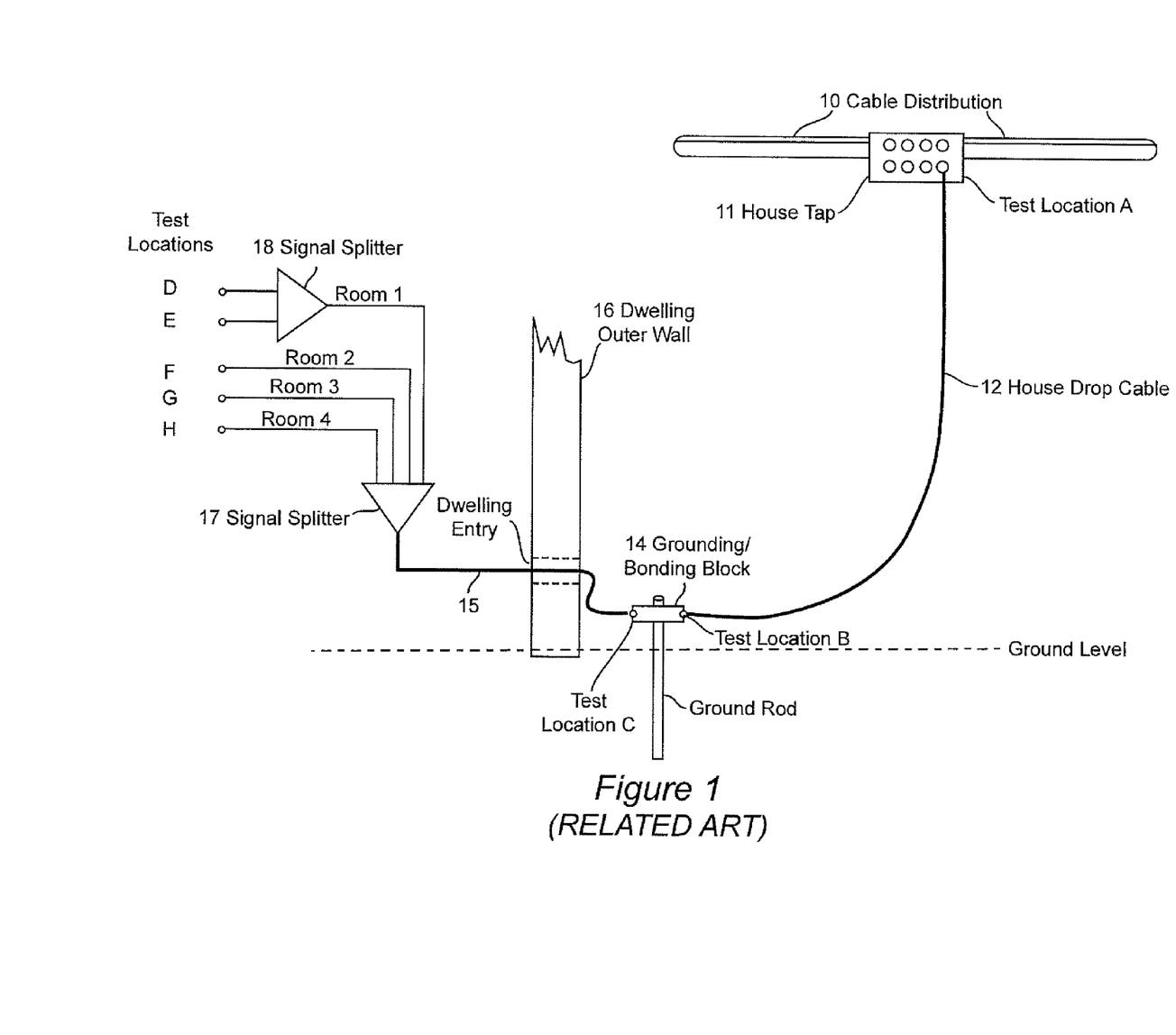
FIG. 1 is a schematic diagram of a Broadband Communications System cable drop installation illustrating required test points thereof.

Referring now to the drawings, and more particularly to FIG. 1, there is schematically shown an exemplary cable drop installation to which the invention is applicable. Since FIG. 1 is arranged to facilitate an understanding of the application of the invention, no portion thereof is admitted to be prior art in regard to the present invention. Further, at the level of abstraction illustrated, the invention may or may not be included in the illustration of FIG. 1 and FIG. 1 has thus been designated "Related Art". It is also to be understood that while the invention will be described in connection with a Broadband Communications System (sometimes, for convenience, referred to hereinafter as a cable system) in which the invention is particularly advantageous, the invention is also applicable to other types of distributed systems such as power, water and natural gas distribution systems and other utilities as well as dedicated communication or data processing systems or networks and the like.

In FIG. 1, an exemplary portion of a cable distribution system 10 is illustrated with a tap 11 attached thereto to deliver the signal carried by the cable distribution system to a residence, business facility or the like or upstream communications such as internet access and telephone service over drop cable 12. In general, it is desirable and often required by local codes that the installation be grounded to prevent incursion of electrical discharges from the environment such as lightning and a grounding or bonding block 14 or the like is illustrated for performing such a function. An entry cable 15 then carries the signal through any structure (e.g. wall 16) which may be found at the installation site to a signal splitter and/or amplifier(s) 17 which provides the signal to different locations at the installation site as may be required or desired. Further signal splitters and/or amplifier(s) 18 may be provided as may be required for a particular installation. The plurality of branches thus provided are then terminated at so-called set-top-boxes (STBs) capable of receiving and decoding the distributed signal and/or interfacing an upstream signal to the cable system or, possibly, high-speed cable modems for bidirectional communications such as telephony. Junctions between some of these structures are useful as test points to isolate such structures to determine defects and to conduct other desired tests.

For example, test point A will provide an indication of signal quality in the cable distribution system 10 as delivered by tap 11. Test point B allows determination of defects in the drop cable 12 as well as determining (with the drop cable 12 disconnected) any noise that is coupled to the installation from the environment of the installation site which could be propagated upstream and to cable distribution system 10. Test point C allows testing efficacy of the grounding provided by grounding/bonding block 14. Test points D-H allow testing for defects or degraded signal propagation over entry cable 15 and signal splitters/amplifiers 17 and 18 as well as the connecting cables which can usually be individually traced efficiently if a problem is encountered.

During installation and/or problem diagnosis a test instrument will generally be connected to each of these test points, in order, to trace signal propagation and maintenance of signal quality. Using prior known test instruments, the instrument would be connected to a test point with or without disconnection of downstream portions of the system, a test sequence initiated from the keyboard or other input arrangement of the test instrument, measurements made in accordance with programmed procedures stored in the test instrument (some procedures possibly being specific to a test point or a combination thereof) and the results displayed to an operator of the test instrument who would then be capable of evaluating them, diagnosing any abnormality and taking any required remedial action.

In general, due to the complexity of test protocols and combinations of test sequences of each such protocol, test instruments currently in use or available are generally programmed to carry out relatively long sequences of test protocols autonomously upon initiation of testing by an operator. The test protocol(s) would then proceed until an abnormal or out-of-tolerance result was detected by analysis also programmed into the test instrument. At that point, the test protocol(s) would be interrupted and relevant test results displayed on the test instrument for review and further analysis by the operator. The test instrument can also, through such analysis capability, make suggestions in regard to repairs or other requirements of an installation. The operator can then take remedial action and, when completed, the test protocol(s) restarted or resumed from a point before that which produced the abnormal or out-of-tolerance result.

The test results (before and after any remedial action) may also be stored in the test instrument for later downloading. However, performing the downloading after return of the test instrument to a central facility or the like engenders delays that are generally undesirable to installation and/or maintenance personnel since they are generally compensated based upon the number of repair or installation calls performed (but not necessarily whether the installation and/or maintenance was performed completely, correctly or effectively). From the standpoint of the cable system administrator or operator (as distinct from the test instrument operator, installation and/or maintenance personnel), while the downloading of test data from the test instrument is desirable for archival storage and performance documentation purposes, delays incurred by downloading test data at the central facility or the like is also undesirable since it cannot be performed while the installation and/or maintenance personnel remain on site and thus has no potential for reducing frequency of "call-backs" to complete, correct or revise installation or maintenance work.

If a portable data processor with wireless communication capability or other wireless communication device is available to the operator of the test instrument, it could be used independently of the test instrument at this point to communicate test results to system storage and/or a central facility as alluded to above. Doing so manually by technical maintenance and installation personnel is becoming increasingly frequent to close work orders in a more timely fashion even though it is cumbersome, subject to errors or possible falsification (unless automated data downloading from the test instrument to the portable data processor is provided in the field; requiring each data processor to be separately and specially programmed for the purpose) and requires much redundant structure to be provided by the test instrument and the data processor; each of which must necessarily be capable of operating as a stand-alone device. However, the personal computer or communication device cannot perform testing and currently available testing instruments cannot perform communications of the test data gathered other than possibly by storing the data for later downloading.

In this regard, it should be understood that, as Broadband Communications Systems corresponding to a single provider become increasingly large or multiplied, management of the technical field staff becomes an ever-increasingly important and complex issue. Centrally controlled (e.g. centrally of a cable system or centrally for a plurality of service providers) workforce management systems could provide a dramatic improvement to the otherwise unwieldy task of ensuring that accurate and acceptable test results are obtained, while collapsing the customer-scheduled installation time window to a reasonable and generally acceptable interval.

Success for application of such management tools that may exist or are foreseeable depends on several key factors including but not limited to the ability to dynamically allocate a subscriber-based job or work order to the appropriate installation or maintenance technician without the need to waste valuable time in returning to a maintenance facility location, the ability of the installation and/or maintenance technician to implement tasks required by the job or work order, the ability to guide the technician through the complex task of qualifying an installation by quantifying critical operational system parameters or simply verifying effectiveness of work performed, the ability for the installation technician to close the subscriber-based job or work order, the ability of the system to store and forward test results to a central facility, the ability to make the information available to Broadband Communications System Management and the ability to forward a subsequent job or work order to the technician while in the field but, preferably, only upon verification of correct, complete and effective work being performed at a current job site. It can be readily seen that substantial improvements in overall Broadband Communication System operation in all of these areas is fundamentally dependent on substantially real-time collection and distribution of accurate test results to the operator and to facilities for performing analyses and taking actions required to achieve the above-enumerated and other capabilities.

Figure 2:
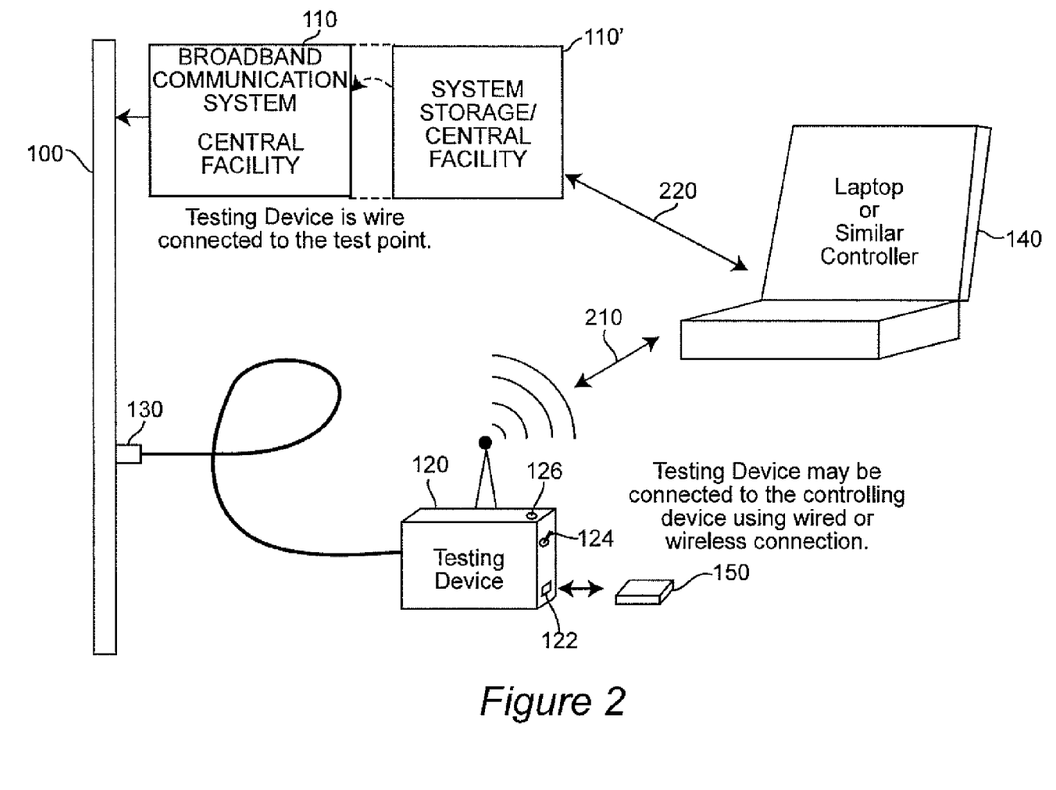
FIG. 2 is a simplified schematic diagram of the overall testing system in accordance with the invention.

Referring now to FIG. 2, a high-level schematic overview of the architecture of the test system in accordance with the invention is illustrated. In FIG. 2, reference numeral 100 generically depicts any of elements 10, 12 or 14-18 of FIG. 1 which may carry broadband communication signals to or from central facility 110 which are to be observed during testing and which include any or all of the test points A-H of FIG. 1 to which testing device 120 may be connected by a suitable connection arrangement such as a cable and suitable connector 130. Testing device 120 is preferably in communication with a laptop or other portable type personal computer or device having similar data processing, communication and display capabilities or a special purpose, dedicated controller 140 having display and manual data entry capability similar to that of a personal computer over a short-range bi-directional communication link 210 such as may be provided by a "Bluetooth" standard device, inductive coupling link (e.g. near-field standard device), Wi-Fi, an arrangement for connecting to a wireless mobile Wi-Fi "hot-spot", wireless telephony or the like or may be detachably hard wired using universal serial bus (USB) protocols and connections. Testing device 120 also preferably includes some test data analysis capability at least to the extent of detecting abnormal or out-or tolerance test results.

Processing/communication device or dedicated controller 140, of course, must include a complementary communication structure for establishing link 210. Further, device or controller 140 is optionally but preferably in communication via Wi-Fi, wireless telephony, radio transmission or the like with a preferably archival storage arrangement 110' that may be provided in a central facility, distribution hub or the like of the cable system and/or in an independent central facility providing storage analysis and/or documentation services to a plurality of cable systems over a communication link 220 which is preferably wireless at least in part using wireless telephony, wireless messaging, VoIP, Wi-Fi, possibly in connection with an arrangement for providing a mobile Wi-Fi "hot-spot", or the like. Device or controller 140 also preferably contains a programmed processor capable of performing analyses of test data; preferably in somewhat greater detail and comprehensiveness than is provided in testing device 120. Such pre-programmed data processing capability sufficient for the practice of the invention is currently being provided in a wide variety of so-called palm-top portable devices including so-called tablet computers, smart phones and the like which are entirely sufficient to perform the functions required of device or controller 140. Since such devices currently provide additional types of inputs such as voice response, gesture-responsive inputs, input devices responsive to orientation, motion, acceleration and the like and touch screens and allow complex display manipulations in response thereto and can be foreseen, can provide for additional types of inputs and additional display manipulations that can facilitate the assimilation of information by a user and otherwise increase convenience of measurement by installation and/or maintenance personnel such devices thus may be found to be also well-suited for practice of the invention. Therefore use of any of these types of currently available or foreseeable devices as device or controller 140 is considered to be within the scope of the present invention. Further, as the general advance of technology provides additional functionality to such devices, any added functionality that is found to facilitate testing incident to installation or repairs may be exploited without requiring alteration of the testing device or, at most, minimal upgrading of software, as will be discussed in greater detail below.

Testing device 120 preferably is constructed in a housing which may be small and compact since it need only accommodate a battery for power, arrangement 130 for hardwired connection to a test point, a programmable microprocessor and measurement circuitry controllable thereby (e.g. filters, spectrum analyzer, comparators and the like), at least one but preferably two connection ports 122 such as a universal serial bus (USB) port(s), preferably a wireless communication module or circuit capable of short range communications (e.g. Bluetooth, Wi-Fi or the like), a power switch and, optionally, one or only a few indicators 126 such as light-emitting diodes sufficient to indicate status (e.g. on/off, stand-by/active testing states, test interruption/detected error and the like) as will be discussed in greater detail below. Such a device can be constructed in a very robust and rugged structure since it has no internal moving parts and electrical components can be provided on a very few integrated circuit chips which may be assembled on a circuit board which provides a very compact and rugged assembly. Ruggedness can be enhanced, if desired, by potting the circuitry or portions thereof in resin, foam or the like or using similar structural expedients. Otherwise, the physical aspects of the testing device are not at all critical to the practice of the invention and can be freely chosen to enhance convenience of handling and use.

Device or controller 140, as alluded to above, is physically separate from the testing device 120 and is preferably a commercially available laptop, notebook, or palm-top personal computer, such as a tablet computer, smart phone or the like or commercially available object tracking device as alluded to above but may, advantageously, be a dedicated device since much of the structures and functional elements which would normally be included in a fully functional portable computer or even a palm-top device capable of wireless communications to a network may be unnecessary and can be eliminated to reduce cost and weight while some adaptations to improve convenience of field use may be included. That is, controller 140 need only have the capabilities of receiving operator input, issuing commands, displaying returned test results, supporting communication links 210 and 220 and, possibly, storing and transmitting test program sequences as will be discussed in greater detail below. Further, a special purpose controller device 140 may have an advantage in being incapable of functioning for other, more general purposes and thus be less likely to be put to unintended uses or to have commercial value outside the system of the invention (e.g. to deter theft or incur unauthorized wireless telephony charges). On the other hand, as alluded to above, laptop and palm-top devices are currently carried into the field by technicians for communication purposes and additional functionalities (e.g. upgrades) may be desired that could be implemented by programming of a commercial, general-purpose computer that might be precluded or require hardware changes in a dedicated device. In fact, during experimental field use, it has been found preferable to use compact data processing devices such as tablet computers and smart phones and the like essentially to simply interrogate the testing device 120 and provide useful manipulations of the display to facilitate diagnosis of any problem and to provide an interface or gateway for the testing device 120 to reach the outside world to provide measurement data and to download specifications to the testing device 120 to allow it to properly communicate and interact with whatever device a user may wish to use as device or controller 140. By doing so and thus leveraging new capabilities and developments in such palm-top devices as have been occurring with increasing frequency at the present time, user convenience can be maximized while avoiding obsolescence of the tester device 120.

Some advantages and possible improvements in system performance and security may also be achieved with a dedicated device by using a communication protocol which is specific to the communication of test data or a particular deployment of a testing system. For example, a proprietary or otherwise unique transmission code or communication protocol specific to a particular system instance and/or anticipated data can potentially decrease communication length and/or prevent a competitor from compiling statistics on performance of a given distributed system. Nevertheless, a portable computer is suitable for use as device or controller 140 in the practice of the invention, even if not optimally convenient or secure. Further, as will be discussed in greater detail below, the processing power available in a personal computer and the majority of currently available palm-top and smart phone devices is often completely adequate for implementing a proprietary code for communication link 220 as well as communication link 210 even though communication link 210 is a short range link such as bluetooth or a so-called near field link and thus does not ordinarily present any significant risk of interception. Nevertheless, proprietary coding for link 210 can still result in faster communication of captured test data and analysis thereof over link 210 to device or controller 140.

The invention does not usually require any change in constitution of existing systems including Broadband Communication System facilities, distribution hubs or storage facilities for system performance data other than to provide extended data collection and analysis capabilities as will be discussed in greater detail below. Broadband Communication Systems, in particular, will generally include equipment having the capability of receiving data by wireless telephony and storage of collected performance data. However, if optional communication link 220 to central facility 110' is employed, as is preferred, some wireless telephony, VoIP or the like interface should be provided as part of the BCS central facility 110. On the other hand, it should be understood that since communications link 220 is wireless, it is unimportant to the successful practice of the invention whether the data collection, analysis, dispatching, installation qualification and the like are provided as part of a given system or these functions provided at a single independent facility 110' or small plurality thereof as a service to a larger plurality of otherwise independent systems 100, 110 as is, in fact, preferred since numerous economies can be achieved. Both of these possibilities or a combination thereof are depicted by dashed lines and a dashed arrow connecting the BCS central facility and the storage analysis and management central facility 110' supported by and forming part of the present invention.

It is also preferred, as part of central facility 110', to centrally provide for technical analysis of test result data and the capability of providing additional diagnostic testing sequences automatically if normal test sequences and remediation techniques do not achieve a suitable level of performance when testing and repairs are being performed. Additionally, the analysis can confirm that the installation or maintenance work is complete, correct and effective for the purpose of qualifying an installation and/or closing a work order; allowing communication of a new work order to the technician. Further, both the test data and the results of technical analysis (before or after storage) can be communicated to a facility for collecting statistics and/or performing further and different types of analysis for management purposes and to support additional system capabilities, as alluded to above. Providing some or all of these functions centrally as a service to a plurality of systems also promotes consistency of performance provided by otherwise independent distributed systems.

Figure 3:
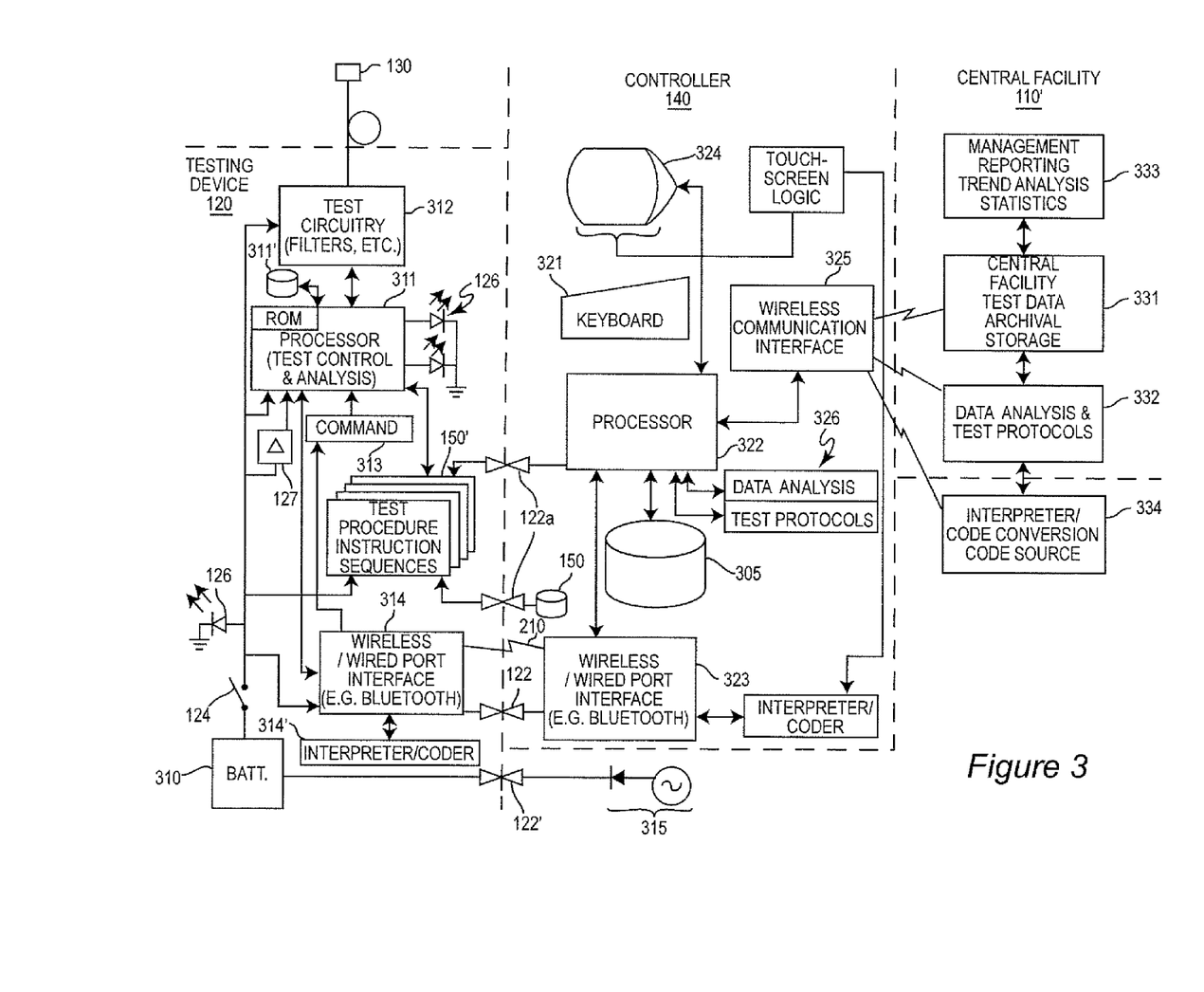
FIG. 3 is a schematic diagram of preferred architecture and functional elements for practice of the invention.
Figure 4:
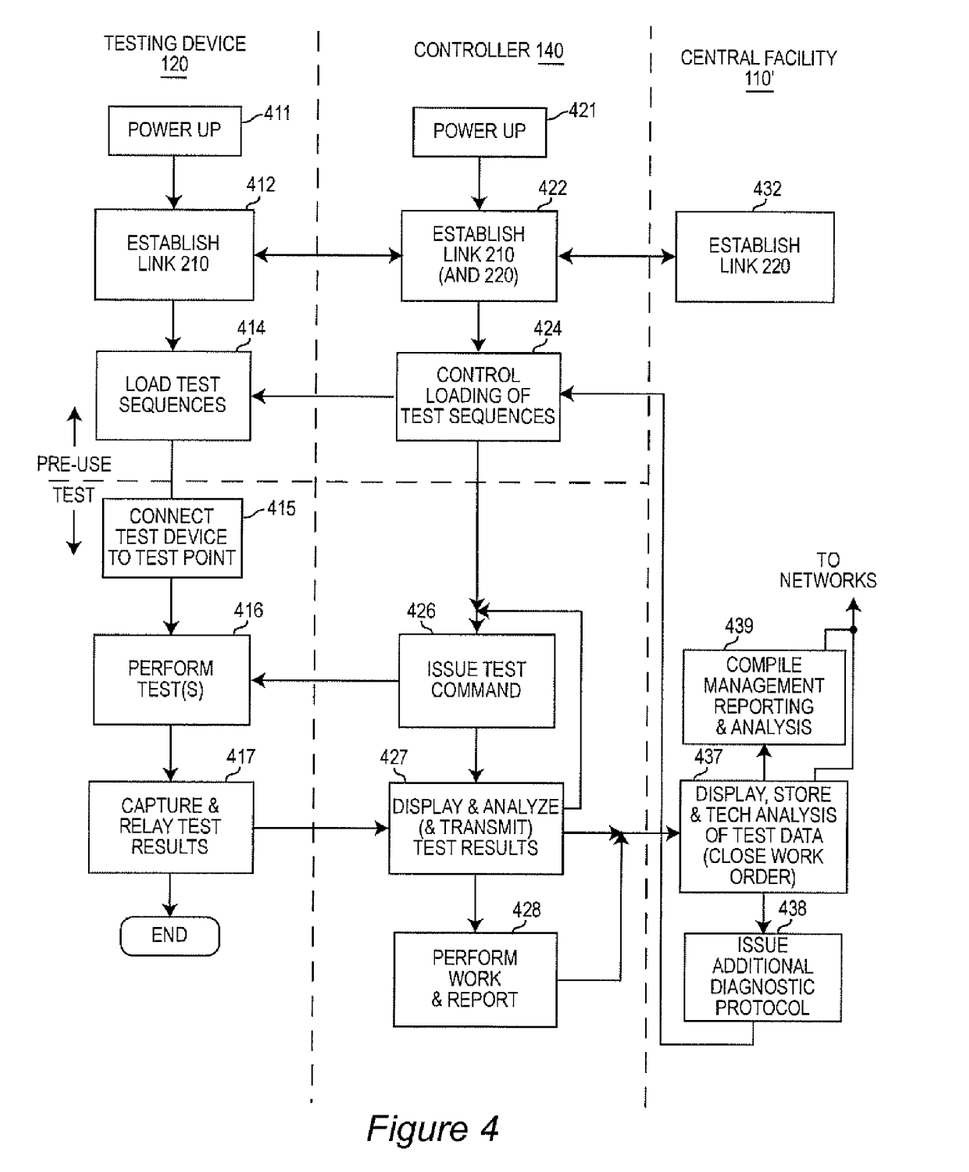
FIG. 4 is a flow chart and data flow diagram illustrating the methodology of the invention during use.

Referring now to FIGS. 3 and 4, the preferred architecture and methodology in accordance with the invention will now be described in detail. It should be understood that only portions of the architecture and methodology which support operations and usage of the invention in a currently preferred manner and in accordance with the basic principles and objectives of the invention are illustrated and discussed. Other capabilities using the same or additional elements will be evident to those skilled in the art and may be included at will as may be desired, particularly in combination with other instrumentation that may be appropriate to other capabilities of the distributed system or test equipment of interest. For example, device or controller 140 could include additional elements to generalize its control function to devices other than testing device 120. Similarly, in accordance with the invention, device or controller 140 need not exercise any control function at all during use but may merely interrogate the testing device 120 to obtain stored test data and results of analyses performed thereon in testing device 120 whenever communication link 210 is available through proximity of testing device 120 and device 140. In such a case, while it is desirable for the potential for control to be maintained for device or controller 140, the only control required is the ability to control additional tests beyond normal testing routines and, on rare occasions, to control transfer of code to testing device 120 to correspond to coding in accordance with a proprietary code or handling or interpretation of data transferred to device 140 to allow for such data to be properly displayed and manipulated through device 140, both of which will be discussed in further detail below.

Figure 5:
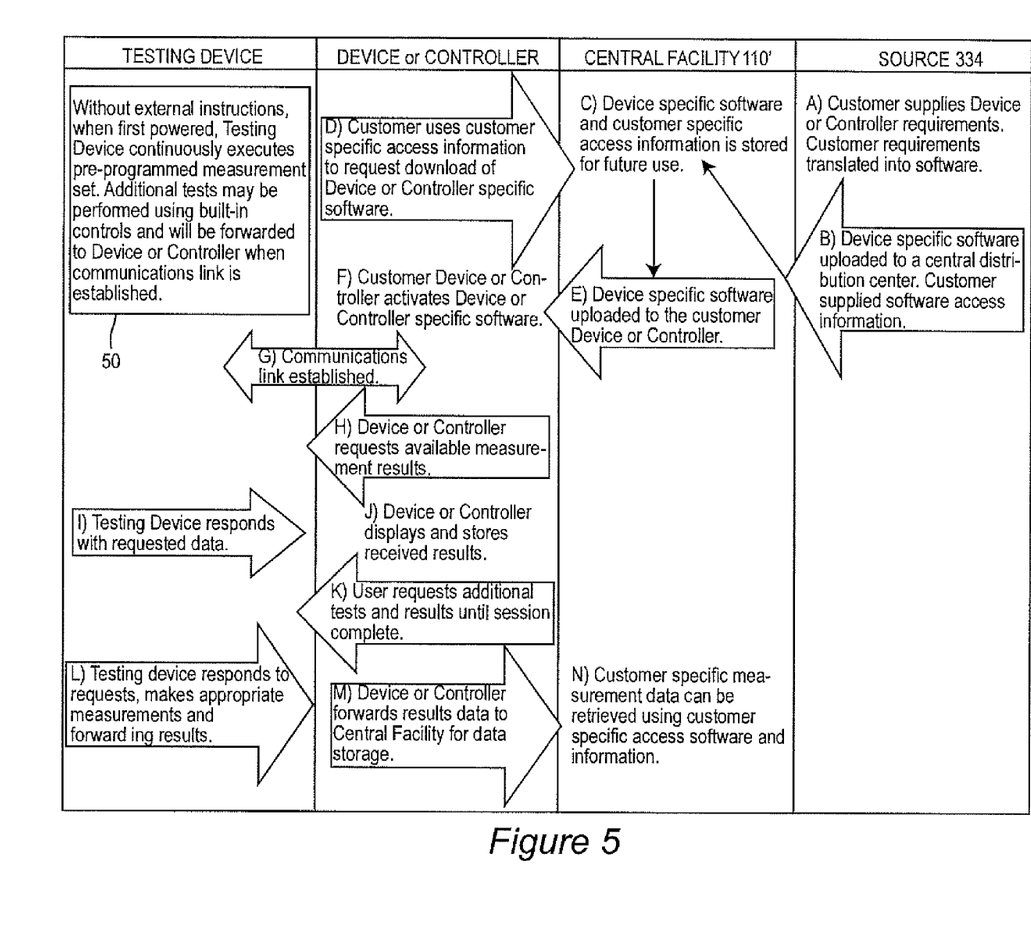
FIG. 5 illustrates communications between portions of the system in accordance with the invention to provide for inclusion of any type of wireless communications device having a display as an output interface for an automated testing device operating in a stand-alone manner.

It may be helpful to note that both FIG. 3 and FIG. 4 are divided into three columns by dashed lines. The left column of FIGS. 3 and 4 illustrates the basic constitution and function, respectively, of the test device 120. Similarly, the center column of FIGS. 3 and 4 illustrates the constitution and function, respectively, of controller 140. Likewise, the right column of FIGS. 3 and 4 illustrates the constitution and function of a central facility or the like 110' (or central facility 100 of the distributed system insofar as it involves the present invention). In FIG. 3, the right column is further divided to indicate a source of interpreter or code conversion code 334 which may be transferred to device 140 and then, if needed, to testing device 120 either directly or through the central facility 110' in accordance with the invention. An example of the additional communications appropriate to this latter function is illustrated in FIG. 5. It should also be understood in the following discussion that some elements of FIG. 3 may be illustrated in a duplicated form using more or fewer elements than are illustrated in a manner that is intended to increase clarity. For example, more or fewer indicators 126 may be used to indicate testing device status or indicators may be omitted altogether. Similarly, the four ports illustrated and indicated by reference numerals 122, 122' and 122a could be embodied in a single (e.g. USB) plug and socket arrangement while provision of only two such ports is deemed preferable; one for accommodation of a hardwired but detachable connection for control signals or for battery charging while the testing device 120 is not in use, and the other for accommodating an external storage device 150 for downloading of test procedure instruction sequences from, for example, a thumb-drive, which could, alternatively, be provided from storage 305 over one of the connectors 122a or connection 122 or wireless link 210 as circumstances and user convenience may dictate.

It is preferred that testing device 120 be powered by a rechargeable battery 310 with power delivered to the respective constituent elements thereof through switch 124 (which may be indicated by an LED 126). Battery 310 may be recharged from a schematically illustrated power source 315 which may include connection to power distribution mains and a power converter (schematically illustrated as a diode) and a charging voltage supplied to battery 310 through connection 211'. As a practical matter, however, connection 122' would preferably be embodied by connector 122, preferably in the form of a USB port commonly used for charging cellular telephone handsets but which could be used, when needed, for downloading data or communicating commands or code sequences in accordance with the present invention from the controller 140 since it is unlikely that communication of programming or commands would be desired concurrently with battery charging.

When testing is anticipated (and battery 310 properly charged), both the testing device 120 and controller 140 are powered up as indicated at steps 411 and 421 of FIG. 4 such as by closing switch 124. It should be noted and understood that device or controller need not be powered up for testing device 120 to be used for stand-alone testing and collection and basic analysis of test data and collection of data prior to powering up device 140 may be preferable in some cases for conserving battery power or, conversely, device 140 may be kept continuously energized to perform other communication functions of which it is capable. Therefore energization of device 140 when testing device 120 is also energized is assumed for simplicity in the following discussion. Such provision of power in the testing device could be indicated by an indicator 126 connected thereto. The provision of power can also be used, as is preferred, to initiate a pre-programmed test sequence in the testing device 120 as an input to processor 311 after a suitable delay 127. Once power is supplied to both the testing device 120 and controller 140, wired or wireless communication link 210 may be established either autonomously (e.g. by a Bluetooth arrangement) or by processors 311 and 322 as indicated at steps 412 and 422 of FIG. 4 whenever the testing device 120 and the device or controller 140 are brought into sufficient proximity to each other. However, it is to be understood that communication link 210 is not necessary for the testing device to be used to perform tests in a stand-alone manner. Optional communications link 220 may also be established concurrently and is assumed to be established throughout the remainder of this discussion. Then, using communication link 210, loading of appropriate test sequences (as may, for example, be determined from a work order for installation, repairs, upgrades, modifications or the like) may be controlled from controller 140 as illustrated at step 424 of FIG. 4 but is preferably pre-programmed in storage 311' or 150 to be executed when the testing device is energized. If controlled from device 140, such control is generally asserted by a manual input from keyboard 321 but may be automated in response to a transmission from a central assembly or distribution hub 110', either of which may issue a command to processor 322. Control from a central facility is particularly useful where detailed analysis and diagnosis is performed at a central facility or distribution hub 110 which may specify a particular, specific and specialized test protocol be performed; programming for which can be downloaded to storage 326 using processor 322 in controller 140. In response to such a command, processor 322 issues a command which is communicated to wireless/wired port interface 323 which communicates appropriate signals (i.e. the signal protocol used is unimportant to the successful practice of the invention) to wireless/wired port interface 314 over wireless link 210 or a wired connection through port 122 and one or more commands are preferably buffered at buffer 313 and communicated to processor 311 in turn. This buffering allows several test protocols and/or repetition thereof to be specified in advance to allow substantially autonomous operation of the testing device 120 once testing is initiated. Then, under local control of processor 311, the desired test sequence instructions, which may comprehend one or more long sequences of test procedures, can be downloaded from the controller 140 (from memory 305 to internal memory 150') or from an external memory such as a so-called thumb-drive 150 and preferably stored in memory. Alternatively, testing device 120 can be operated directly from external memory 150 if the thumb-drive remains connected to testing device 120 (in which case, memory 150' could be omitted or reduced in size to function principally as an instruction buffer) but such a mode of operation is not preferred in view of the rigors of field testing which could cause external memory 150 to be dislodged and testing to be thus disrupted. it is currently preferred for a plenary test sequence to be initially loaded into the testing device 120 and maintained in memory 311' such that a substantially complete set of tests will be run whenever the testing device 120 is powered up.

The operations and functions described above enable the testing device 120 to perform whatever tests may be deemed appropriate to the work desired to be performed on the distributed system and which are performed prior to any test being performed and, preferably before the testing device 120 is connected to any test point. Accordingly, the operations described above are referred to collectively hereinafter as a pre-use phase of operations as distinct from a testing phase, as is illustrated by a horizontal dashed line across the left and center columns in FIG. 4. Provision of a distinct pre-use phase has several advantages in that loading test sequence instructions before use allows the test sequence instructions and analysis parameters to be updated from time to time as the expected measured parameters of the distributed system may change. Further, downloading test sequence instructions reduces the likelihood of corruption of such signals and increases the likelihood that any corruption of such signals will be discovered. Additionally, since some test sequences will be common to different regions of the distributed system as well as different test points at a given work site, as described above, one pre-use phase may suffice for a plurality of work orders at a plurality of different work sites and thus a pre-use phase may be performed much less frequently than a testing phase. Moreover, a given system may exhibit certain types of problems much more often than others and which are revealed by test sequences which should be normally performed whenever any type or one of certain types of work is performed on the distributed system while some diagnostic testing sequences may be performed only rarely. Therefore, loading of test sequence instructions which are specific to and common in regard to certain types of work allow those sequences to be rapidly performed from an instruction memory of very limited size while rarely performed sequences can be downloaded from memory 305 or from, for example, a central facility or distribution hub 110' as may be needed.

The initial loading of test sequence instructions when a different device 140 is to be used also preferably includes loading of interpreter and/or coding information to device 140 from an external source either directly or through the central facility 110'. Currently available and foreseeable wireless communication devices generally include an interpreter which functions to associate particular data or imagery that may be available in an arbitrary application that can be run on the wireless communication device with particular locations on the screen that can be selected by touching the touch screen of the wireless communication device and manipulated by gestures on or near the touch screen. Voice commands or other natural inputs can be associated with particular data in much the same manner. However, in the case of the present invention, the application that can be run on the wireless communication device is simply a communication and display protocol including commands that can be understood by the testing device 120 and information for interpretation and proper utilization of the data and analysis information that is supplied from testing device 120. Therefore, complementary interpreter and/or coding information must be supplied to the testing device 120 during initial configuration and manufacture to identify the test data captured so that no further change in the testing device 120 is necessary for the application stored in device 140 to interface the data so identified to the interpreter 327 resident on device 140 to allow information in memory 311' to be properly identified, formatted and manipulated when transferred to device or controller 140. However, in the rare but foreseeable occasions where some change in test data identification may be required by a communications device used as device or controller 140, suitable code to upgrade testing device 120 can preferably be obtained from device 140. This feature of the present invention not only allows convenience in viewing and documenting test results by a user but also allows any arbitrary existing or foreseeable wireless or wired communication device capable of a reasonably detailed display to be incorporated into the testing system of the invention simply by writing and loading a suitable "application" for the communication device used as device 140 and the interpreter/coder 327 included therein and then, if needed, loading complementary interpreter information for identifying the data to be associated with data fields of the "application" into the testing device. Thus, any manipulation of the display provided by the communication device can be applied to the test data and analysis information provided from testing device 120. This further feature of the present invention also allows updating of the interpreter to accommodate changes in testing protocols and/or system performance specifications to accommodate changes made from time-to-time in the system being tested as well as leveraging new capabilities of communication devices to improve user convenience of testing and diagnosing problems in the system being tested. Both of these further capabilities provide avoidance of obsolescence of the testing device 120 from either changes in the system being tested or new developments in display technology.

Referring now to FIG. 5, several preferred communication sequences are illustrated. In FIG. 5 the division of the right side column of FIG. 3 is represented as two columns at the right side of FIG. 5 representing the central facility 110' on the left (of the right-most two columns) and interpreter application/coding code source 334 on the right. Three communication sequences are depicted beginning with steps A, D and G, respectively. The first two of these three sequences beginning at steps A and D will now be discussed separately as the preferred methodology and embodiment of the invention for adapting an arbitrary communication device, sometimes referred to as a customer device since it is supplied by a user of the system in accordance with the invention, for use in the system of the invention.

Beginning at step A, when a new communication device suitable for use in the system of the invention becomes available or use of a particular device is requested by a user or customer of the system or a customer or user of the system of the invention requests additional capabilities, source 334 will develop and supply software code for an application to meet device or capability specifications. This software is then preferably downloaded to the central facility of the requester or all central facilities of users of the system of the invention, possibly as a subscription service or the like, as shown in step B. Thus the new or upgraded application will be stored and available at all or selected ones of the central facilities of users of the system, as shown at step C. Thus all or most applications for various communication devices are resident at a given central facility and can be accessed as needed. This completes the first of the three communication sequences illustrated in FIG. 5.

When it is desired by a user/customer to adapt any particular physical communication device (e.g. not necessarily a newly developed type of communication device but only one not previously used with the system such as a newly acquired communication device or controller) for use in the system of the invention, customer specific access information is sent from the device, itself, to request a download of device or controller specific software, as shown in step D. In response, the device specific software is loaded (step E) to the device or controller to supply the communication device or controller with the application needed for the device or controller to properly interpret test data as identified for storage and transmission by the testing device 120. The customer device or controller software is then activated from the customer device or controller as shown in step F. This completes the second of the three communication sequences illustrated in FIG. 5 and enables the arbitrary communication device to be used as device or controller 140 for communication with testing device 120.

The test phase of operation of the invention begins with connection of the testing device 120 to a test point such as those described above through attachment of connector 130, as depicted at step 415 of FIG. 4. Commands for individual test sequences can be issued from processor 322 in response to manual input at, for example, keyboard 321. (As is well understood in the art, other input arrangements such as voice commands or selection from displayed menus or the like may be alternatively or additionally employed.) Such commands are transmitted through wireless/wired port interfaces 323 and 314 to processor 311 which then extracts the corresponding test sequence instructions from internal memory 150' or external memory 150 and controls test circuitry 312 comprising spectrum analyzers, filters, comparators and the like as is well-understood in the art to perform tests and capture data reflecting particular operational parameters of the distributed system, as depicted at steps 416 and 417 of FIG. 4. However, as indicated above, it is currently deemed preferable to initiate testing from the testing device, itself, and independently of device or controller 140 and to initiate only additional tests from controller 140. In general, raw data is transmitted from test circuitry 312 and correlated and categorized and placed in a suitable format for transmission by processor 311, preferably in accordance with the interpreter/coding information 314' to the interpreter 327 to which the interpreter/coding information is complementary, in accordance with the display capabilities of the communication device 140, and then conveyed through wireless/wired port interfaces 314 and 323 and communication link 210 or connection 122 to processor 322 where they may be stored in internal memory and/or memory 305 from which they may be displayed and/or transmitted. The captured data may be buffered or transmitted in real time to controller 140 where they are displayed to the user and, preferably transmitted to the central facility or distribution hub 110' as depicted at step 427.

More specifically, as shown in the third communication sequence illustrated in FIG. 5, when the testing device 120 and device/controller 140 are brought into sufficient proximity (e.g. effective range of Bluetooth, near-field communication standard, etc. range) to each other, communication link 210 is established as illustrated at step G. If additional interpreter/coding code is needed by the testing device 120, it can be loaded to the testing device 120 as an incident of establishing communication link 210. It will be recalled that, preferably, testing device 120 is performing tests and capturing test data at any time it is powered up, as illustrated at 50 of FIG. 5. Once communication link 210 is established, device or controller 140 can interrogate testing device 120 for all available measurement and test data results as shown at step H, to which the testing device 120 responds as shown at step I. The test data and results are then displayed and stored in device or controller 140. If the device or controller 140 and the testing device are in sufficient proximity for communication link 210 to exist while testing device 120 is performing tests, test data and results can be viewed with device or controller 140 in substantially real time.

If additional tests are desired, they can be initiated from device or controller 140 as shown in step K. The test sequence for such additional tests may be stored in testing device 120, supplied or loaded from external memory 150 or loaded from the device or controller 140 as needed. Test sequences can also be provided from the central facility through communication link 220 and device or controller 140. The testing device then responds by performing the additional test sequences, capturing data and forwarding the captured data to device or controller 140, as illustrated in step L, from which they can be viewed as discussed above. Steps K and L can be repeated in a looping fashion until the testing session is deemed to be complete.

It should be appreciated that in view of the potential length of test protocols and sequences thereof, it is common to initiate a sequence of test protocols and allow the testing device to proceed autonomously, possibly with programmed pauses to provide time for the technician to disconnect from one test point and reconnect to another test point. For the same reason of potential test sequence length, it is generally provided for testing to be interrupted or halted when abnormal or out-of-tolerance test data is encountered. However, it is currently preferred to allow a plenary test sequence to complete, whether or not abnormal conditions are encountered. When results of substantially full normal testing is complete, the user will be able to view all captured test data and analysis information and will be thus usually enabled to make a full diagnosis of all potential problems and to take proper remedial action whereas taking remedial action based on an out-of-tolerance test result as it is encountered may be misleading and cause remedial action that does not address the actual problem. Since the basic test protocols are essentially based on sampling of signals in particular signal bands, the samples can be captured very quickly but, depending on the length and complexity of test sequences that may be pre-programmed in accordance with the invention. the operator may need to leave the tester connected to a given test point for a few minutes to assure that the test sequence is complete before moving the testing device connection to another test point in a predetermined sequence to capture all relevant data for the portion of the system of interest. Analysis of the test results can be performed during intervals between connections or after test data capture is complete. Testing at second and subsequent locations may be initiated by a switch on the testing device 120, detection of completion of connection to a test point (e.g. by detecting a signal of interest), in a timed manner or in other ways that will be evident to those skilled in the art, the details of which are unimportant to the successful practice of the present invention.

It should also be noted that some degree of analysis of the test data that may differ in degree of thoroughness is preferably provided at each of the testing device 120, device or controller 140 and central facility 110'. That is, analysis at the testing device 120 may only be a pass/fail or go/no go determination while the analysis at controller 140 may be sufficient to provide diagnosis of routinely encountered problems and to suggest remediation or confirmation procedures and full diagnosis and possibly generation of special purpose testing protocols may be performed only at central facility 110'. On the other hand, since the location where the analysis is performed is immaterial to the user, it is currently considered preferable to provide sufficient analysis for diagnosis of most frequently encountered problems in the testing device 120 in order to reduce processing power requirements and interpreter programming in the communication device 140.

By the same token, it is often the case that the technician will move the testing device 120 without moving controller 140 and may even exceed the range where communication link 210 can be maintained. Therefore it is preferable to provide non-volatile storage 311' in the testing device to store test data that cannot be immediately transmitted. Likewise, it is convenient and preferred to provide indicators 326 capable of indicating not only on/off condition of the testing device but whether or not it is in an active testing or stand-by state (e.g. to confirm response to a command to initiate testing) and also whether or not testing has found abnormal or out-of-tolerance test results or has been halted in response thereto and the state of communication link 210. Other conditions such as successful connection to a test point could, of course, be included or alternatively provided. Similarly, it is convenient and preferred to allow some control by the technician at the testing device 120 to at least control re-initiation or resumption of testing from the tester such as by detecting a short interruption of power or a momentary contact included within the power switch in a manner which is not critical to the practice of the invention and may be implemented in a wide variety of ways as will be evident to those skilled in the art.

Based on the displayed test results the user/operator of the test system may perform work and possibly report the work to the central facility or distribution hub 110'. If work is performed based on results of testing, the test may be and typically would be repeated by looping to 426. If test data is transmitted to the central facility or distribution hub, as is preferred, it may be analyzed as illustrated at step 437 and instructions issued or, if acceptable, the work order may be closed and another work order issued. Alternatively, if the test results are not within nominal limits, additional diagnostic tests and test sequence instructions may be issued and downloaded to the testing device 120 through processor 322 as described above and depicted at step 438 followed by step 426 (in the pre-use phase of operation) as described above. The user may run the additional diagnostic tests before and/or after further work is performed by issuing a command corresponding thereto as described above. When test results are acceptable, use of the testing device 120 ends and the work order may be closed and the test results stored; allowing personnel to be directed to another work site where the invention can be used again as described above, often without requiring repetition of the pre-use phase operations described above. More specifically, and again referring to FIG. 5, the device or controller 140 can then forward the test results and analysis to the central facility for storage (step M) from which they can be further analyzed, as desired, or retrieved for management or administrative purposes, as depicted at step N, such as closing a given work order (or issuing further instructions while installation or service personnel remain on site if the results are unsatisfactory) and issuing a further work order while installation or service personnel remain in the field.

Further, as a perfecting feature of the invention which is not necessary to its successful practice in accordance with the basic principles thereof, both acceptable and unacceptable test results and information concerning aspects of the performance of work orders (e.g. collected from identifications of tests performed which also infers work performed and time stamps of transmissions on links 210 and 220) may be collected and/or distributed to a facility 439 or over a network connection for classification, statistical compilation and management analysis to support management decisions, scheduling, dynamic allocation and dispatching of appropriate technical personnel (e.g. by training and ability as well as proximity to a new work site) without requiring return to a maintenance facility for re-assignment and installation or maintenance equipment projecting service time windows for subscribers and the like as alluded to above.

In view of the foregoing, it is clearly seen that the invention provides a light weight, simplified and inexpensive testing system for a distributed system and which is particularly convenient and advantageous for application to a Broadband Communications System. The testing system in accordance with the invention avoids redundancy of structure between stand-alone testing devices and commercially available portable computers that have been used for communication of test results to a central facility and management of work orders. The apparatus of the test system allows numerous operational and safety advantages (e.g. avoiding an ohmic connection from a test point to a controller 140) and can be fabricated as extremely rugged structures that may be freely adapted to provide a high level of convenience to a user in a variety of environments of use and which provide for simple modifications to be made in software to accommodate both changes in the system to be tested and to accommodate any communication device capable of a reasonably detailed display and manipulation thereof by a user; both features serving to avoid obsolescence of the testing device, itself. The methodology of use can also be rapidly executed while allowing simplification and limitation of circuitry required for providing a high degree of flexibility of use. The invention also supports and preferably includes an infrastructure for distribution and analysis of any aspect of Broadband Communications System performance for distribution and analysis of data collected at any point, end-to-end of the system to support virtually any management function that may be desirable to promote efficiency of the Broadband Communications System and its operations While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A test system for measuring operating parameters of a distributed system, said test system comprising:
   a testing device including
   a connector for connection to a test point,
   a memory for storing instructions for a plurality of test sequences and for identifying and formatting captured data for storage and/or transmission,
   a processor responsive to commands for executing said instructions to perform said test sequences~ capturing and analyzing data responsive to said test sequences and to identify data captured responsive to said test sequences and storing results of said capturing and analyzing data, and
   a short range communication structure capable of transmitting said results of said capturing and analyzing data;
   a controller physically separate from said testing device including a manual input arrangement,
   a processor responsive to said manual input arrangement for controlling storage and execution of said instructions for a plurality of said test sequences in said testing device and receiving, storing, further analyzing results of said capturing and analyzing and displaying data captured by said testing device, and
   an interpreter to associate data captured responsive to said test sequences with portions of a display; and
   a communication link complementary to said short range communication structure between said testing device and said controller for communicating control signals and said instructions for a plurality of said test sequences from said controller to said testing device and communicating said data captured and analyzed by said testing device to said controller when said testing device is within communication range of said controller over said communication link including said short range communication structure, and
   a display for displaying said results of said capturing and analyzing, when received from said testing device, and results of said further analyzing of said results.

2. A test system as recited in claim 1, further comprising a further communication link from said controller to a central facility or distribution hub for communication of test data comprising said results of said capturing and analyzing, when received from said testing device, and results of said further analyzing of said results and information concerning operation of said communication link between said testing device and said controller to a central facility or distribution hub.

3. A test system as recited in claim 2, further comprising a facility for storing and providing technical analysis of said test data.

4. A test system as recited in claim 3, further comprising a facility for providing management analysis of work performance data and said test data.

5. A test system as recited in claim 1, wherein said testing device further includes
   at least one indicator for indicating status of said testing device.

6. A test system as recited in claim 5, wherein at least one of an active testing/stand-by state, status of said communication link between said testing device and said controller and halting or interruption of a test sequence is indicated.

7. A test system as recited in claim 1, wherein said testing device further includes an analysis facility capable of detecting abnormal or out-of-tolerance test data.

8. A test system as recited in claim 1, wherein said communication link between said testing device and said controller is a wireless link.

9. A method of testing portions of a distributed system, said method including:
   establishing a communication link between a testing device and a device distinct from said testing device including a display;
   storing instructions for a plurality of test sequences in said testing device under control of said controller or in a storage device connected to said testing device;
   storing interpreter or coding information for identifying or coding data which will be captured by said plurality of test sequences in said device distinct from said testing device,
   connecting said testing device to a test point of said distributed system;
   performing said plurality of test sequences and collecting and analyzing test data at said testing device;
   transmitting said test data and results of analyzing said test data from said testing device to said device including a display over a short range communication structure in said testing device when in communication range of said device including a display over said short range communication structure, interpreting said test data in accordance with said interpreter or coding information; and displaying said test data, results of said analyzing of test data at said testing device and results of said further analyzing of said test data and results of analyzing test data at said device including a display.

10. A method as recited in claim 9, further comprising a step of communicating said test data, results of said analyzing of test data at said testing device and results of said further analyzing of said test data and results of analyzing of said test data and information concerning operation of said communication link between said testing device and said device including a display indicating work performance data to a central facility or distribution hub.

11. A method as recited in claim 10, further comprising a step of storing and providing technical analysis of said test data.

12. A method as recited in claim 11, further comprising a step of providing management analysis of said test data and work performance data.

13. A method as recited in claim 9, further comprising a step of indicating status of said testing device at said testing device.

14. A method as recited in claim 13, wherein at least one of an active testing/stand-by state, status of said communication structure between said testing device and said controller and halting or interruption of a test sequence is indicated.

15. A method as recited in claim 9, further comprising a step of detecting abnormal or out-of-tolerance test data at said testing device.

16. A method as recited in claim 9, including the further step of providing said communication structure between said testing device and said device including a display with a wireless link.

* * * * *